(12) United States Patent
Ryan

(10) Patent No.: US 9,062,825 B2
(45) Date of Patent: Jun. 23, 2015

(54) GREASE GUN

(71) Applicant: Michael C. Ryan, Mitchellville, IA (US)

(72) Inventor: Michael C. Ryan, Mitchellville, IA (US)

( * ) Notice: Subject to any disclaimer, the term of this patent is extended or adjusted under 35 U.S.C. 154(b) by 0 days.

(21) Appl. No.: 13/928,063

(22) Filed: Jun. 26, 2013

(65) Prior Publication Data

US 2013/0341360 A1    Dec. 26, 2013

Related U.S. Application Data

(60) Provisional application No. 61/664,704, filed on Jun. 26, 2012.

(51) Int. Cl.
*G01F 11/00* (2006.01)
*F16N 3/12* (2006.01)
*F16N 5/02* (2006.01)

(52) U.S. Cl.
CPC ... *F16N 3/12* (2013.01); *F16N 5/02* (2013.01)

(58) Field of Classification Search
CPC ......... B05C 17/005; F16N 3/10; F16N 37/02; F16N 5/02; F16N 3/12
USPC ................ 222/256–258, 262, 263; 184/105.2
See application file for complete search history.

(56) References Cited

U.S. PATENT DOCUMENTS

| | | | |
|---|---|---|---|
| 1,338,743 A | 5/1920 | Lyman | |
| 1,351,841 A * | 9/1920 | Craven | 184/45.1 |
| 1,475,980 A | 12/1923 | Zerk | |
| 1,585,538 A * | 5/1926 | De Loach | 222/340 |
| 1,593,791 A | 7/1926 | Butler | |
| 1,604,434 A | 10/1926 | Welch | |
| 1,668,002 A * | 5/1928 | Brown | 222/262 |
| 1,686,309 A * | 10/1928 | Zabriskie | 222/256 |
| 1,723,269 A * | 8/1929 | Davis | 222/254 |
| 1,744,305 A | 1/1930 | Gannaway | |
| 1,856,372 A * | 5/1932 | Buchet | 222/262 |
| 1,883,279 A | 10/1932 | Zerk | |
| 1,931,973 A | 10/1933 | Zerk | |
| 1,941,140 A * | 12/1933 | Dodge | 222/256 |
| 1,956,073 A | 4/1934 | Krause | |
| 1,970,373 A | 8/1934 | Gray | |
| 1,972,181 A | 9/1934 | Chambers | |
| 1,976,061 A | 10/1934 | Eastman | |
| 1,996,792 A * | 4/1935 | Bystricky et al. | 222/95 |
| 1,996,929 A | 4/1935 | Mays | |
| 2,114,507 A * | 4/1938 | Smith | 222/262 |
| 2,220,297 A | 11/1940 | Smith | |
| 2,308,400 A | 1/1943 | Sundholm | |
| 2,425,867 A * | 8/1947 | Davis | 222/231 |
| 2,433,506 A * | 12/1947 | Davis | 222/262 |
| 2,435,647 A * | 2/1948 | Engseth | 92/129 |
| 2,521,569 A * | 9/1950 | Davis | 222/256 |
| 2,695,975 A | 11/1954 | Sanford | |
| 2,708,600 A * | 5/1955 | Oscar | 239/319 |
| 2,805,797 A | 9/1957 | Neuman | |
| 2,872,085 A * | 2/1959 | Mueller | 222/376 |
| 2,915,226 A * | 12/1959 | Sundholm | 222/340 |
| 3,343,722 A | 9/1967 | Santos | |
| 3,807,606 A * | 4/1974 | Foerst et al. | 222/262 |
| 4,257,540 A * | 3/1981 | Wegmann et al. | 222/262 |

(Continued)

Primary Examiner — Frederick C Nicolas
Assistant Examiner — Patrick M Buechner
(74) Attorney, Agent, or Firm — Prudens Law LLC

(57) ABSTRACT

A grease gun head has a rotating cylindrical lobed channel situated within the head so that the grease gun may utilize its own grease pump to refill its grease reservoir. The channel and configuration of ports may also be modified to remove the need for rotation of the grease channel.

2 Claims, 4 Drawing Sheets

(56) References Cited

U.S. PATENT DOCUMENTS

| | | | | |
|---|---|---|---|---|
| 4,664,298 A | * | 5/1987 | Shew | 222/287 |
| 5,067,591 A | * | 11/1991 | Fehlig | 184/55.1 |
| 5,105,912 A | | 4/1992 | Heister | |
| 5,199,614 A | | 4/1993 | Husman | |
| 5,323,934 A | * | 6/1994 | Isert | 222/326 |
| 6,068,164 A | | 5/2000 | Totaro | |
| 6,135,327 A | * | 10/2000 | Post et al. | 222/333 |
| 6,900,416 B1 | | 5/2005 | Erik | |
| 7,377,406 B2 | | 5/2008 | Linkletter | |
| 7,527,176 B2 | | 5/2009 | Weems | |
| 7,631,905 B2 | | 12/2009 | McGee | |
| 7,828,119 B1 | | 11/2010 | Schirado | |
| 8,162,184 B2 | * | 4/2012 | He et al. | 222/256 |
| 2004/0055826 A1 | | 3/2004 | Bowers | |
| 2004/0231927 A1 | * | 11/2004 | Huang et al. | 184/105.2 |
| 2006/0060426 A1 | * | 3/2006 | Chen | 184/105.2 |
| 2006/0108180 A1 | * | 5/2006 | Grach et al. | 184/105.2 |
| 2006/0196890 A1 | * | 9/2006 | Song et al. | 222/262 |
| 2008/0029549 A1 | * | 2/2008 | Hulden | 222/256 |
| 2010/0116850 A1 | | 5/2010 | Weems | |
| 2010/0294808 A1 | * | 11/2010 | He et al. | 222/326 |
| 2012/0298697 A1 | * | 11/2012 | Guo | 222/256 |
| 2013/0327790 A1 | * | 12/2013 | Ryan | 222/95 |

\* cited by examiner

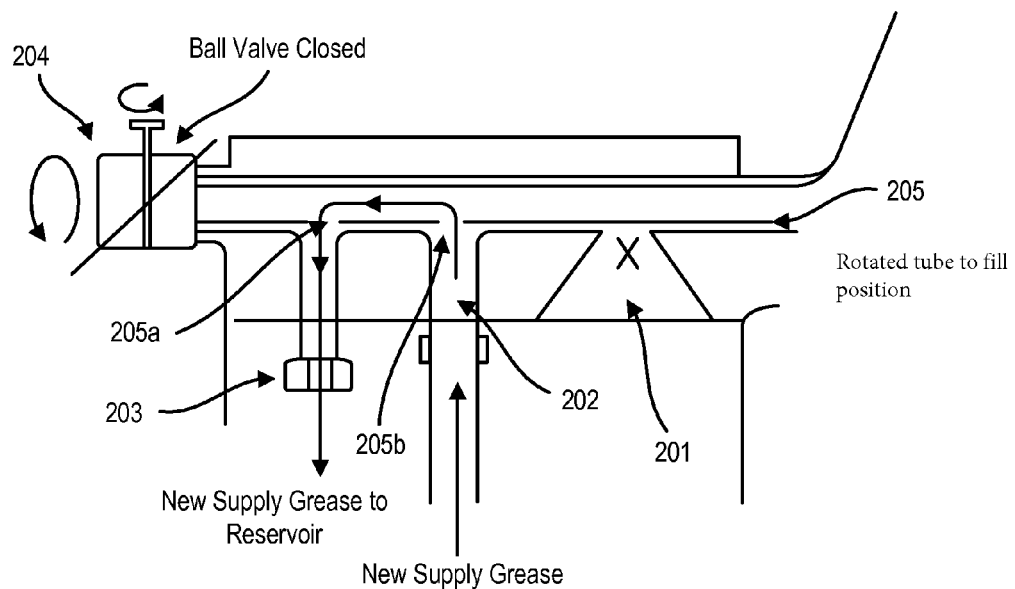
FIG. 2 (Bottom Fill)
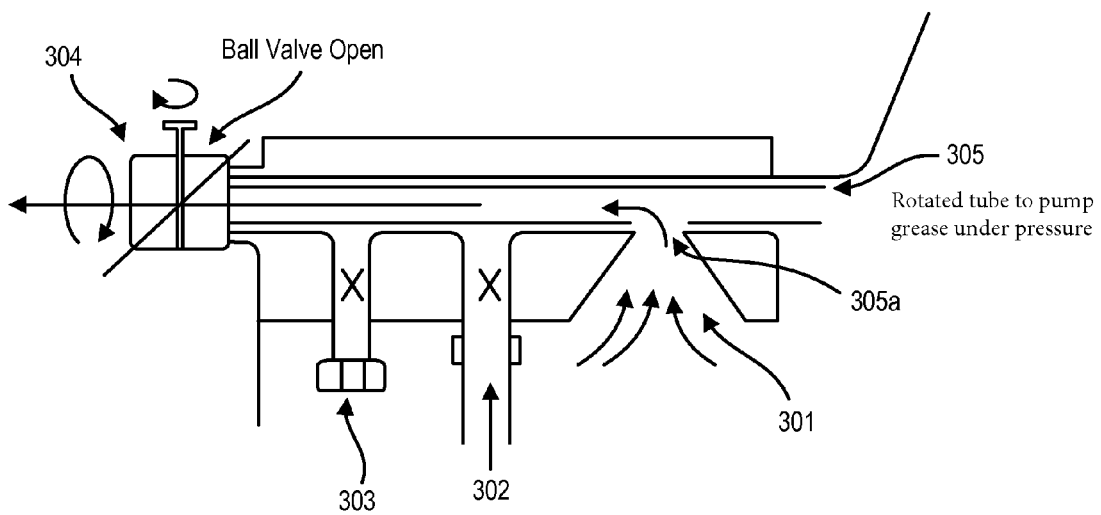
FIG. 3 (Bottom Fill)

GREASE GUN

The present invention claims priority to and the benefit of U.S. Provisional Application No. 61/664,704, entitled "System and Methods that Provide for a Refillable Grease Gun that Uses Its Own Pumping Mechanism to Refill Its Reservoir," filed on Jun. 26, 2012, the contents of which are incorporated herein by reference.

BACKGROUND OF THE INVENTION

1. Field of the Invention

The present invention is generally related to the operation of grease guns. More particularly, the present invention pertains to a system and method for refilling the reservoir of a grease gun without the need of a secondary pump.

2. Introduction

Grease guns utilize a reservoir, for example, tubes or cartridges, to hold grease while a plunger, pull rod mechanism, or other similar mechanism forces grease from the reservoir to a dispenser. When the gun runs out of grease, the tube in the reservoir is usually replaced. Replacing the reservoir generally means using multiple steps to remove the spent tube or cartridge and replacing it with a new one. Replacing the reservoir also means that one comes into contact with grease residue contained in the old reservoir or grease from the new reservoir resulting in an unwanted mess. Moreover, disposal of the spent reservoir becomes an environmental concern because of the remaining grease residue. Though the grease gun has been improved over the years, grease residue resulting from the process of switching from an old grease reservoir to a new grease reservoir remains an issue. Related U.S. Application No. U.S. application Ser. No. 13/916,569, entitled "Refillable and Rechargeable Grease Gun Reservoir," describes a refillable and rechargeable grease gun reservoir that eliminates or partially eliminates the prior process of changing grease tubes.

However, even with improved grease gun reservoirs, one still needs a secondary pump to be able to pump refill grease into a grease gun reservoir. Prior grease guns are generally configured to allow grease to flow "one way" from the grease gun reservoir through the grease gun head onto the desired application. To refill the grease gun, either the manual method described above is used or a secondary pump is used to recharge and refill the reservoir. This adds to the amount of equipment needed to service modern grease guns. What is needed is a system and method that eliminates or partially eliminates the need for a secondary pumping mechanism to refill the grease gun.

SUMMARY OF THE INVENTION

While the way in which the present invention addresses the disadvantages of the prior art will be discussed in greater detail below, in general, the present invention provides for an improved grease gun that utilizes its own grease pump to refill an attached grease reservoir.

An improved grease gun has a cylindrical grease channel situated within the grease gun head. The cylindrical grease channel has a first end and one or more openings along the longitudinal axis of the cylindrical grease channel. The grease gun head has a check valve operatively coupled to the first end. The cylindrical grease channel is operatively coupled to a guide tube port, a refill grease port, and a grease port. The cylindrical grease channel longitudinally rotates within the grease gun head to a first position and a second position wherein the spacing of the one or more openings is such that when the cylindrical grease channel is rotated to the first position, a first opening is over the grease port and no other opening is over the guide tube port and the refill grease port. When the cylindrical grease channel is rotated to the second position, a second opening is over the guide tube port and a third opening is over the refill grease port and no other opening is over the grease port.

An improved grease gun has a cylindrical grease channel situated within the grease gun head. The cylindrical grease channel has a first end and one or more openings along the longitudinal axis of the cylindrical grease channel. The grease gun head has a check valve operatively coupled to the first end. The cylindrical grease channel is operatively coupled to a refill grease port and a grease port. A piston is situated within the grease channel. Pumping piston has two preset stroke start and stop positions to facilitate refilling the reservoir or pumping service grease.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates operation of an exemplary refillable grease gun head with a lobed grease channel rotated to fill position using a bottom fill configuration.

FIG. 3 illustrates an exemplary refillable grease gun head with a lobed grease channel rotated to pump position using a bottom fill configuration.

DETAILED DESCRIPTION OF THE INVENTION

Various embodiments of the invention are described in detail below. While specific implementations involving grease gun reservoirs are described, it should be understood that their description is merely illustrative and not intended to limit the scope of the various aspects of the invention. A person skilled in the relevant art will recognize that other components and configurations may be easily used or substituted than those that are described here without parting from the spirit and scope of the invention. As will be appreciated by one of ordinary skill in the art, the system may be embodied as a customization of an existing system, an add-on product, and/or a stand-alone system.

The present invention facilitates refilling a grease gun using the gun's own grease pump to internally refill the grease reservoir without a secondary pump. The present invention provides an improved grease gun head with a rotating cylindrical lobed grease channel that acts as a ball valve controlling flow of grease to the appropriate ports situated with the grease gun head. An alterative to a rotating grease channel is to reduce the number of ports in the grease gun head and restrict the pumping action of the pump's piston. The present invention enables the grease gun to use its own pumping capability to receive new supply grease using its own vacuum. Thus, as will become apparent from the following descriptions, the present invention facilitates an efficient and environmentally friendly way to refill a grease gun that eliminates or partially eliminates the need for a secondary pumping mechanism.

Figure 1:
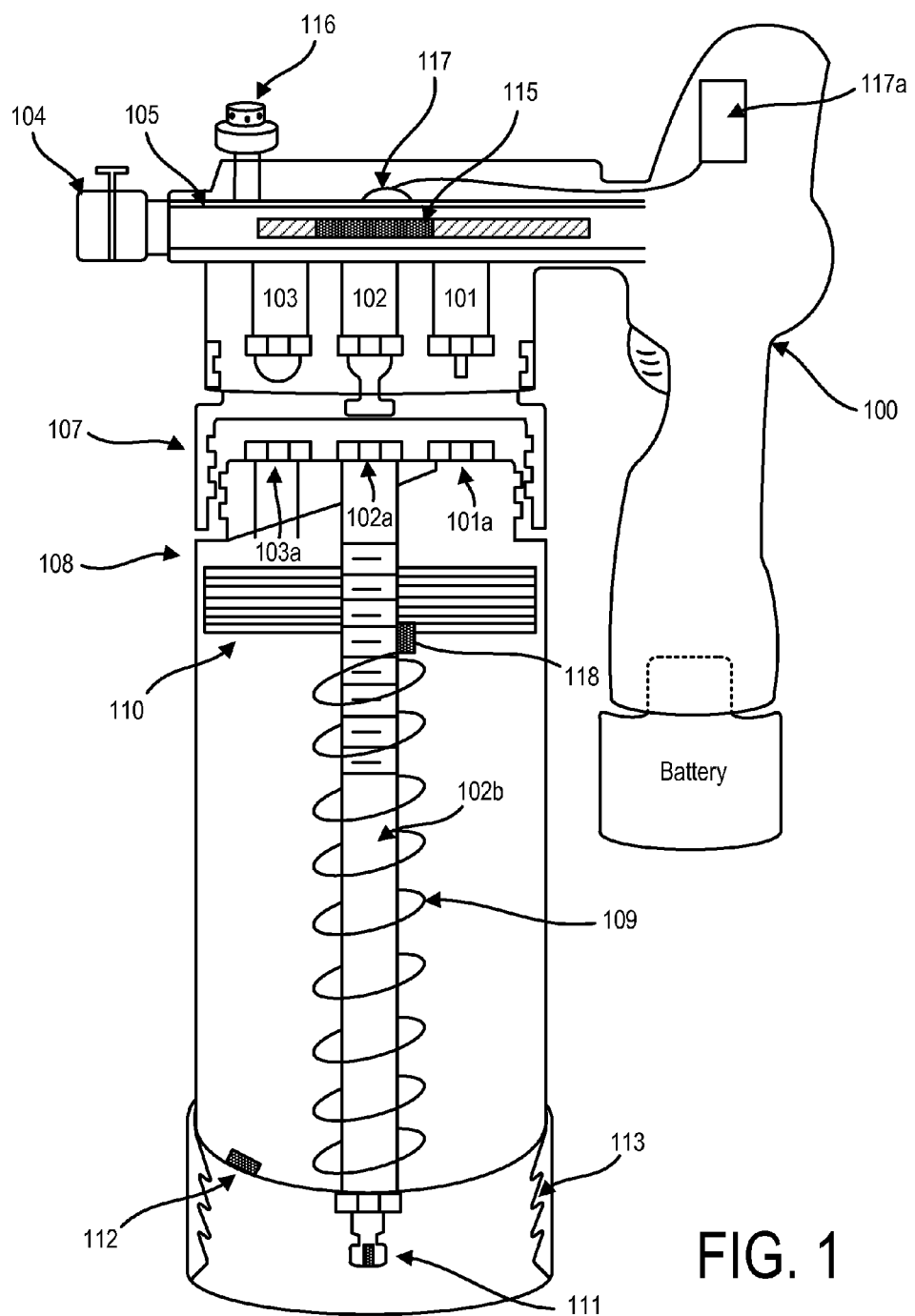
FIG. 1 illustrates an exemplary refillable grease gun of the present invention.

FIG. 1 illustrates an exemplary refillable grease gun of the present invention. A battery-powered grease gun 100 is operatively coupled to a grease gun reservoir 108. An exemplary grease gun reservoir 108 is described in related U.S. application Ser. No. 13/916,569, entitled "Refillable and Rechargeable Grease Gun Reservoir," and is incorporated by reference. Grease gun 100 has a lobed grease channel 105 used to contain and direct grease. The lobed grease channel has three openings such that when rotated within the grease gun housing, the openings match up with ports 101, 102, or 103 so that grease may be properly directed depending on the operation. Within the lobed grease channel 105, a grease pump piston 115 facilitates refilling of the reservoir 108 or pumping service grease through the lobed grease channel 105 and out a check valve 104. Check valve 104 is configured to select an open or closed position depending on whether the grease gun reservoir is to be filled or to pump service grease. When check valve 104 is closed, grease is prevented from exiting the grease gun and instead directed towards ports 101, 102, or 103. Grease gun 100 has a grease port 101, a guide tube port 102, and a refill grease port 103 situated on the bottom of the grease gun 100 such that grease gun reservoir 108 is operatively coupled to the grease gun 100. Grease gun reservoir has grease port 101a, guide tube port 102a, and refill grease port 103a situated on the top of the grease gun reservoir 108. In this embodiment, the reservoir 108 is coupled and secured to the grease gun 100 by screwing the reservoir 108 into the threads 107 on the bottom of the grease gun 100. Upon screwing the reservoir 108 into the threads, grease ports 101 and 101a, guide tube ports 102 and 102a, and refill grease ports 103 and 103a are operatively coupled to each other such that grease may flow through the ports between the reservoir 108 and the grease gun 100 depending on the desired operational mode (e.g., refilling or pumping service grease). Grease gun 100 has an optional pressure relief valve 116 operatively coupled to the service side of the pressure stroke. Grease gun 100 has an optional pressure sensor 117 operatively coupled to a microprocessor 117a to determine the amount of grease within the reservoir 108 and prevent overfilling.

In this embodiment, grease gun reservoir 108 is operatively coupled to the grease gun 100 through threads 107. Although any type of mechanism that secures the reservoir to the grease gun and enables ports from the grease gun and the reservoir to be operatively coupled to each other is suitable and within the spirit and scope of the invention. The reservoir 108 is equipped with guide tube 102b coupled to the guide tube port 102a. The guide tube provides structural support for sliding piston/wiper member 110 and a pathway for refill grease from the fitting/coupling 111 into and through the reservoir 108 to the pumping piston 115. The piston/wiper member 110 is pressurized from below by a compression spring 109 to force grease to the top of the reservoir 108. Although a compression spring is shown in this embodiment, any mechanism, for example, a charged bladder, magnetic repulsion or electronic rotation, to force grease from the reservoir is suitable and within the spirit and scope of the invention. The guide tube 102b may also be operatively coupled to a position sensor/microprocessor assembly 118 for determining the position of the piston/wiper member 110 within the reservoir 108. Reservoir 108 is optionally equipped with a breather/check valve 112. Reservoir may be secured to a docking station through the use of threads 113 or other suitable means to secure the reservoir and grease gun.

FIG. 2 illustrates operation of an exemplary refillable grease gun head with the lobed grease channel 205 rotated to fill position using a bottom fill configuration. To fill the grease reservoir, the lobed grease channel 205 is rotated so that openings 205a and 205b are over refill grease port 203 and guide tube port 202, respectively. The lobed grease channel 205 simultaneously covers grease port 201 such that grease cannot escape the channel through the port (as indicated by the X). Check valve 204 is rotated to a closed position so that grease does not flow out of the grease gun. Refill grease may now be pumped from an external grease supply through the guide tube port 202 into the refill grease port 203 that is opened to the grease reservoir. The grease gun is able to use its own internal pumping capability to refill the reservoir. A secondary pump is not needed.

FIG. 3 illustrates an exemplary refillable grease gun head with the lobed grease channel 305 rotated to pump position using a bottom fill configuration. To return the grease gun to pump position, the lobed grease channel 305 is rotated so that opening 305a is over grease port 301. In this configuration, the lobed grease channel 305 simultaneously covers the guide tube port 302 and refill grease port 303 (as indicated by Xs over the ports). Check valve 304 is rotated to an open position so that grease flows from the grease gun to its desired application. Grease is pumped from the internal reservoir through the grease port 301 into the lobed grease channel 305 and out the check valve 304.

Figure 4A:
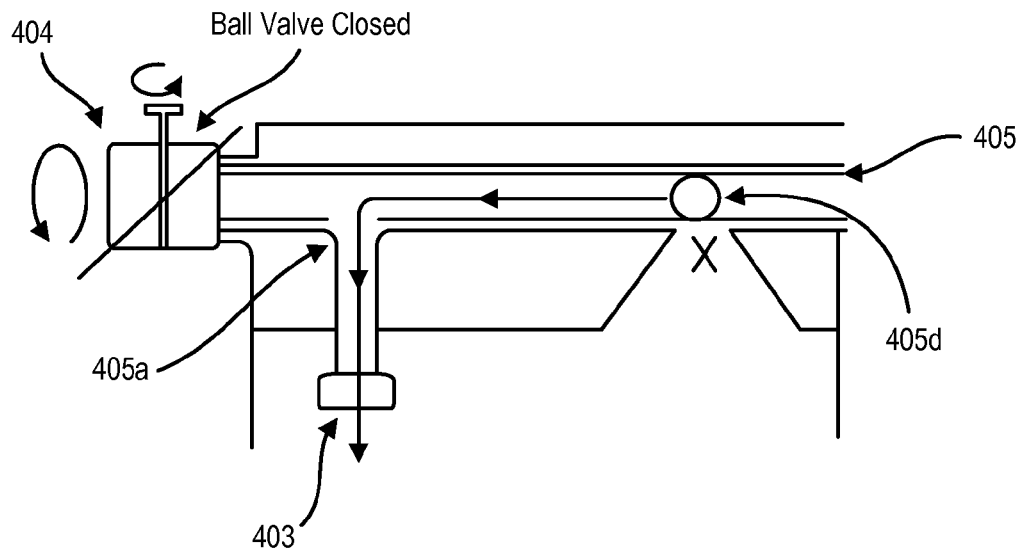
FIGS. 4A-B illustrate an exemplary refillable grease gun head showing operation of the grease gun head using a side fill configuration.
Figure 4B:
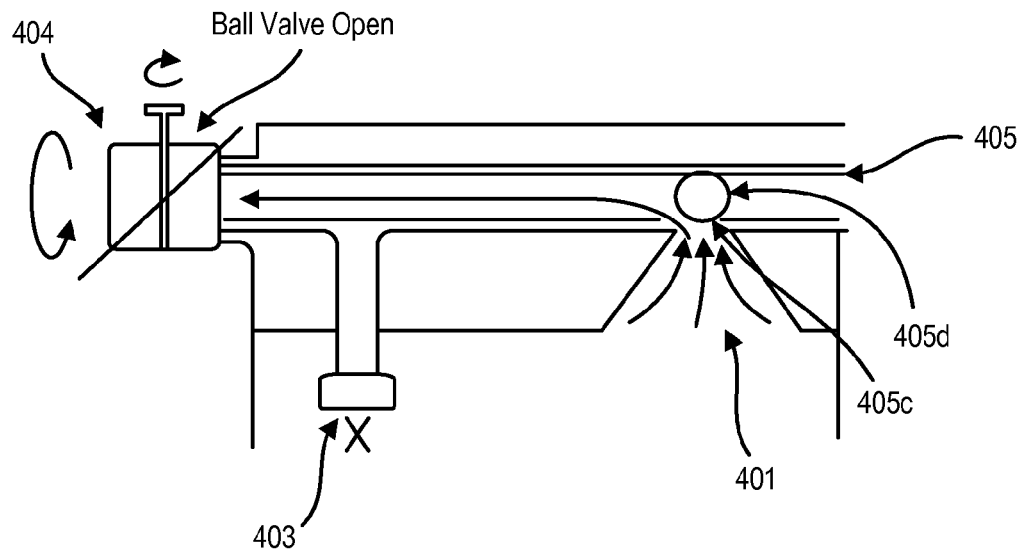

FIGS. 4A-B illustrate an exemplary refillable grease gun head showing operation of the grease gun head using a side fill configuration. Lobed grease channel 405 is rotated such that opening 405a is over refill grease port 403 and that opening 405d is exposed to the outside of the grease gun. Opening 405d is equipped with a suitable fitting/coupling that enables grease to flow from a supply grease container (not shown) into the lobed grease channel 405 via the opening 405d. Ball valve 404 is rotated to a closed position so that grease does not flow out of the grease gun. The grease gun reservoir is able to use its own internal pumping capability to refill the reservoir.

To return the grease gun to pumping operation, and referring to FIG. 4B, the lobed grease channel is rotated such that the channel covers refill grease port 403 and an opening 405c is over grease port 401. Lobed grease channel 405 now covers (i.e., closes) opening 405d (as indicated by the X). Check valve 404 is rotated to an open position so that grease flows from the grease gun to its desired application. Grease is pumped from the internal reservoir through grease port 401 into the lobed grease channel and exits through the check valve 404.

Figure 5:
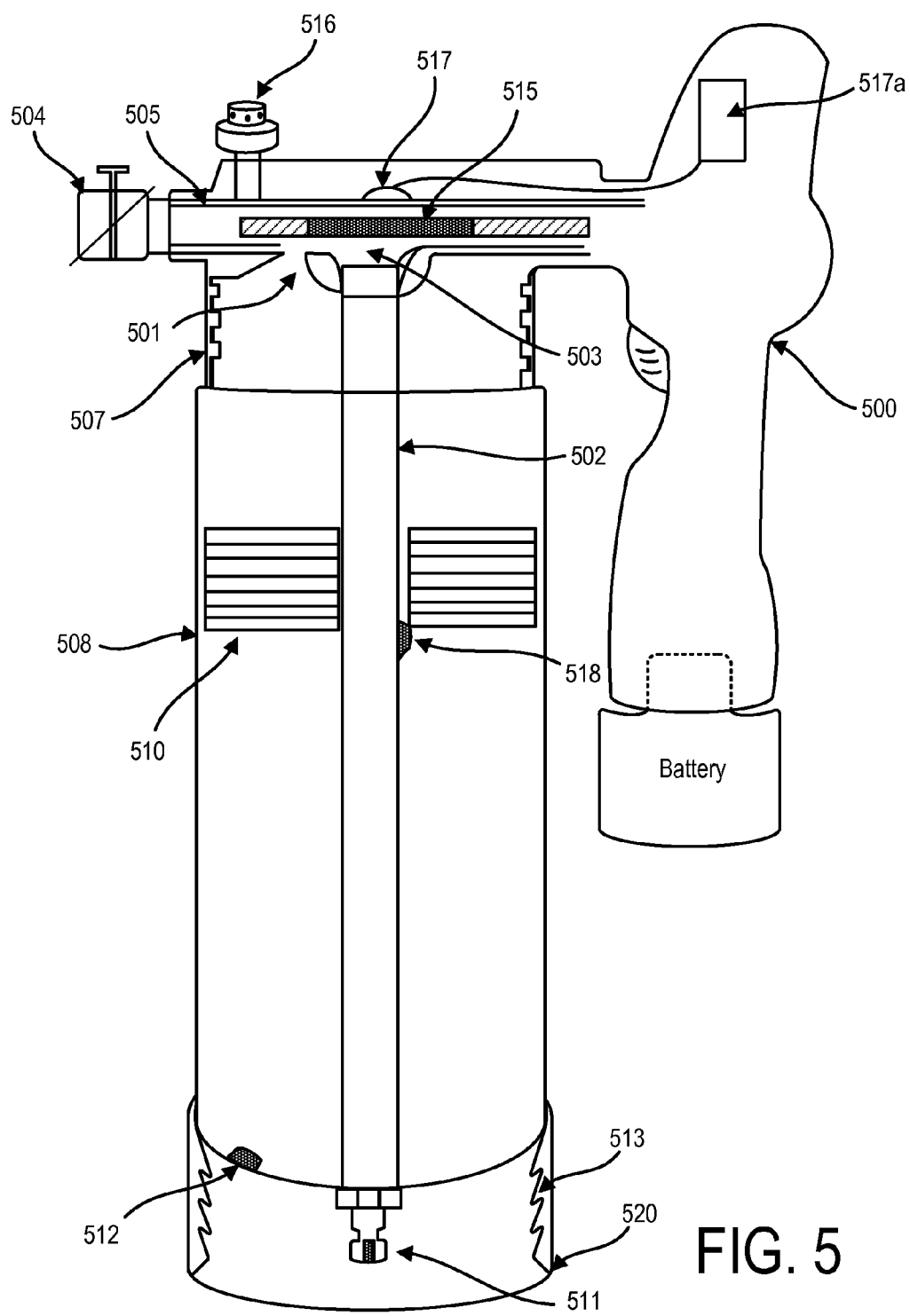
FIG. 5 illustrates an alternative exemplary refillable grease gun employing two ports using a bottom fill configuration.

FIG. 5 illustrates an alternative exemplary refillable grease gun employing two ports using a bottom fill configuration removing the need for to rotate the grease channel. A battery-powered grease gun 500 is operatively coupled to a grease gun reservoir 508. An exemplary grease gun reservoir 508 is described in related U.S. application Ser. No. 13/916,569, entitled "Refillable and Rechargeable Grease Gun Reservoir." Grease gun 500 has a lobed grease channel 505 used to contain and direct grease. The lobed grease channel has two openings that match up with ports 501 and 503 so that grease may be properly directed depending on the operation. Within the lobed grease channel 505, a grease pump piston 515 facilitates refilling of the reservoir 508 or pumping service grease through the lobed grease channel 505 and out a check valve 504. Check valve 504 is configured to select an open or closed position depending on whether the grease gun reservoir is to be filled or to pump service grease. When check valve 504 is closed, grease is prevented from exiting the grease gun and instead directed towards ports 501 or 503. Grease gun 500 has a grease port 501 and a refill grease port 503 situated on the bottom of the grease gun 500 such that grease gun reservoir 508 is operatively coupled to the grease gun 500. In this embodiment, the reservoir 508 is coupled and secured to the grease gun 500 by screwing the reservoir 508 into the threads 507 on the bottom of the grease gun 500. Upon screwing the reservoir 508 into the threads, grease ports 501 and refill grease ports 503 are operatively coupled to the grease gun head and grease channel 505 such that grease may flow through the ports between the reservoir 508 and the grease gun 500 depending on the desired operational mode (e.g., refilling or pumping service grease). Grease gun 500 has an optional pressure relief valve 516 operatively coupled to the service side of the pressure stroke. Grease gun 500 has an optional pressure sensor 517 operatively coupled to a microprocessor 517a to determine the amount of grease within the reservoir 508 and prevent overfilling.

In this embodiment, grease gun reservoir 508 is operatively coupled to the grease gun 500 through threads 507. Although any type of mechanism that secures the reservoir to the grease gun and enables ports from the grease gun and the reservoir to be operatively coupled to each other is suitable and within the spirit and scope of the invention. The reservoir 508 is equipped with guide tube 502 operatively coupled to the grease channel 505 when the reservoir 508 is attached to the grease gun head. The guide tube provides structural support for sliding piston/wiper member 510 and a pathway for refill grease from the fitting/coupling 511 into and through the reservoir 508 to the pumping piston 515. The piston/wiper member 510 may be pressurized from below by any mechanism, for example, a charged bladder, magnetic repulsion or electronic rotation, to force grease from the reservoir 508 through the appropriate port(s). The guide tube 502 may also be operatively coupled to a position sensor/microprocessor assembly 518 for determining the position of the piston/wiper member 510 within the reservoir 508. Reservoir 508 is optionally equipped with a breather/check valve 512. Reservoir may be secured to a docking station through the use of threads 513 or other suitable means to secure the reservoir 508 and grease gun 500.

Pumping piston 515 has two preset stroke start and stop positions to facilitate refilling the reservoir or pumping service grease. When refilling the reservoir 508, check valve 504 is set to a closed position. Pumping piston 515 draws back (i.e., away from the check valve 504) through the grease channel 505 past both the grease port 501 and the refill port 503, which allows grease to travel through the guide tube 502 into the grease channel 505. When the pumping piston 515 moves forward, grease is forced into grease port 501, which refills the reservoir 508. When pumping service grease to a desired application, check valve 504 is set to an open position, which enables grease to exit the grease gun 500. Pumping piston 515 is restricted to draw back only over the grease port 501 drawing up service grease from the reservoir 508 into the grease channel 505 and delivering it to the desired application. The reservoir 508 or docking station 520 may optionally be equipped with an inductive coupling at the bottom of the reservoir 508 or within the threads 513 of the docking stating and reservoir so that the grease gun battery may be recharged during a refilling operation.

Although the above description may contain specific details, they should not be construed as limiting the claims in any way. Other configurations of the described embodiments of the invention are part of the scope of this invention. The descriptions and embodiments are not intended to be an exhaustive or to limit the invention to the precise forms disclosed. Accordingly, the appended claims and their legal equivalents should only define the invention, rather than any specific examples given.

What is claimed is:

1. An improved grease gun head comprising:
a cylindrical grease channel situated within a grease gun head, the cylindrical grease channel having a first end and a plurality of openings along the longitudinal axis of the cylindrical grease channel and wherein the cylindrical grease channel longitudinally rotates within the grease gun head to a first position and a second position;
a check valve operatively coupled to the first end;
a grease port operatively coupled to the cylindrical grease channel;
a guide tube port operatively coupled to the cylindrical grease channel;
a refill grease port operatively coupled to the cylindrical grease channel;
wherein spacing between the plurality of openings is such that:
when the cylindrical grease channel is rotated to the first position, a first of the plurality of openings is over the grease port and no other opening is over the guide tube port and the refill grease port; and
when the cylindrical grease channel is rotated to the second position, a second of the plurality of openings is over the guide tube port and a third of the plurality of openings epees is over the refill grease port and no other opening is over the grease port.

2. An improved grease gun head comprising:
a cylindrical grease channel situated within a grease gun head the cylindrical grease channel having a first end and one or more openings along the longitudinal axis of the cylindrical grease channel;
a check valve operatively coupled to the first end;
a grease port operatively coupled to the cylindrical grease channel;
a refill grease port operatively coupled to the cylindrical grease channel;
a guide tube operatively coupled to the refill grease port; and
a piston situated within the grease channel,
wherein upon a refilling operation, the piston draws back through the cylindrical grease channel over the grease port and the refill grease port; and upon delivery operation the piston only draws back through the cylindrical grease channel over the grease port.

* * * * *